(12) United States Patent
Koranda et al.

(10) Patent No.: US 10,798,083 B2
(45) Date of Patent: Oct. 6, 2020

(54) SYNCHRONIZATION OF MULTIPLE INDEPENDENT IDENTITY PROVIDERS IN RELATION TO SINGLE SIGN-ON MANAGEMENT

(71) Applicant: Red Hat, Inc., Raleigh, NC (US)

(72) Inventors: Lukas Koranda, Brno (CZ); Vlastimil Elias, Brno (CZ)

(73) Assignee: RED HAT, INC., Raleigh, NC (US)

( * ) Notice: Subject to any disclaimer, the term of this patent is extended or adjusted under 35 U.S.C. 154(b) by 286 days.

(21) Appl. No.: 15/898,895

(22) Filed: Feb. 19, 2018

(65) Prior Publication Data
US 2019/0260733 A1 Aug. 22, 2019

(51) Int. Cl.
*H04L 29/06* (2006.01)
*H04L 29/08* (2006.01)

(52) U.S. Cl.
CPC ........ *H04L 63/0815* (2013.01); *H04L 63/083* (2013.01); *H04L 63/0884* (2013.01); *H04L 63/102* (2013.01); *H04L 67/02* (2013.01)

(58) Field of Classification Search
CPC ............... H04L 63/0815; H04L 63/083; H04L 63/0884; H04L 63/102; H04L 67/02
See application file for complete search history.

(56) References Cited

U.S. PATENT DOCUMENTS

| | | | |
|---|---|---|---|
| 8,832,271 B2 | 9/2014 | McCarty | |
| 9,386,007 B2 | 7/2016 | Minov et al. | |
| 9,413,750 B2 | 8/2016 | Akula et al. | |
| 2012/0179828 A1* | 7/2012 | Kobayashi | G06F 21/44 709/227 |
| 2014/0201809 A1* | 7/2014 | Choyi | H04L 63/0807 726/3 |
| 2015/0319156 A1 | 11/2015 | Guccione et al. | |
| 2016/0050234 A1 | 2/2016 | Chyi et al. | |
| 2016/0134619 A1 | 5/2016 | Mikheev et al. | |
| 2016/0366122 A1* | 12/2016 | Rykowski | H04L 63/0815 |
| 2017/0289134 A1* | 10/2017 | Bradley | H04L 63/102 |
| 2018/0152440 A1* | 5/2018 | Hande | H04L 63/0815 |

(Continued)

OTHER PUBLICATIONS

Saml Implementation Guidelines, Aug. 27, 2004, OASIS, https://www.oasis-open.org/committees/download.php/8958/sstc-saml-implementation-guidelines-draft-01.pdf.

(Continued)

*Primary Examiner* — Sarah Su
(74) *Attorney, Agent, or Firm* — Haynes and Boone, LLP

(57) ABSTRACT

A method includes receiving an authentication request from a web application of a user device, the web application running in a browser. The method also includes establishing a local single sign-on session between the local identity provider and the browser and determining that a master identity provider associated with a plurality of local identity providers is unavailable. The method also includes in response to determining that the master identity provider is unavailable, marking the local single sign-on session as unsynchronized with the master identity provider. The method further includes after determining that the master identity provider is available, synchronizing the local single sign-on session with a master single sign-on session that is available to the plurality of local identity providers and marking the local single sign-on session as synchronized with the master identity provider.

20 Claims, 9 Drawing Sheets

(56) References Cited

U.S. PATENT DOCUMENTS

2019/0020646 A1* 1/2019 Magyar ................ H04L 9/0643
2019/0102534 A1* 4/2019 Elias .................. H04L 63/0815

OTHER PUBLICATIONS

Paulmadsen, IDP-initiated Single Sign-On POST Binding, Sep. 30, 2008, http://saml.xml.org/wiki/idp-initiated-single-sign-on-post-binding.

* cited by examiner

US 10,798,083 B2

SYNCHRONIZATION OF MULTIPLE INDEPENDENT IDENTITY PROVIDERS IN RELATION TO SINGLE SIGN-ON MANAGEMENT

BACKGROUND

The present disclosure relates generally to server systems associated with identity providers, and more particularly, multiple, independent identity providers that provide users with single sign-on (single sign-on) sessions. Various online services typically use access control to protect users who interact with such services. Access control involves an authentication process and an authorization process. The authentication process typically involves requesting credentials from a user (e.g., username/password). The authorization process involves specifying rights and privileges to a particular user.

In some cases, a particular software application may have multiple independent software systems that are related. It would be inconvenient for a user to have to log in through each of these software systems. Accordingly, such systems may utilize single sign-on technologies that allow a user to login with credentials to gain access to several systems without having to log in to each separate software system. Single sign-on typically involves a single identity provider that authenticates users across multiple systems and creates a single sign-on session.

SUMMARY

According to one example, a method of synchronizing sessions includes, with a computing system associated with a local identity provider of a plurality of local identity providers, receiving an authentication request from a web application of a user device, the web application running in a browser. The method also includes with the computing system, establishing a local single sign-on session between the local identity provider and the browser. The method further includes with the computing system, determining that a master identity provider associated with the plurality of local identity providers is unavailable. The method also includes in response to determining that the master identity provider is unavailable, marking the local single sign-on session as unsynchronized with the master identity provider. The method further includes after marking the local single sign-on session as unsynchronized with the master identity provider: determining that the master identity provider is available; after determining that the master identity provider is available, synchronizing the local single sign-on session with a master single sign-on session that is available to the plurality of local identity providers; and marking the local single sign-on session as synchronized with the master identity provider.

According to one example, a system for synchronizing sessions includes a memory storing an identifier of a local single sign-on session and an identity of a user of a user device. The system also includes an authentication module that receives an authentication request from a web application of a user device and establishes a local single sign-on session between a local identity provider and a browser in which the web application runs. The system further includes a processing module that determines that a master identity provider associated with a plurality of local identity providers is unavailable and stores the identifier of the local single sign-on session and the identity of the user into the memory. The system also includes a synchronization module that in response to determining that the master identity provider is unavailable, marks the local single sign-on session as unsynchronized with the master identity provider. After the local single sign-on session is marked as unsynchronized with the master identity provider, the processing module determines that the master identity provider is available, and the synchronization module synchronizes the local single sign-on session with a master single sign-on session that is available to the plurality of local identity providers and marks the local single sign-on session as synchronized with the master identity provider.

A machine-readable medium comprising a plurality of machine-readable instructions that when executed by one or more processors is adapted to cause the one or more processors to perform a method comprising: receiving an authentication request from a web application of a user device, the web application running in a browser; establishing a local single sign-on session between the local identity provider and the browser; determining that a master identity provider associated with the plurality of local identity providers is unavailable; in response to determining that the master identity provider is unavailable, marking the local single sign-on session as unsynchronized with the master identity provider; and after marking the local single sign-on session as unsynchronized with the master identity provider: determining that the master identity provider is available; after determining that the master identity provider is available, synchronizing the local single sign-on session with a master single sign-on session that is available to the plurality of local identity providers; and marking the local single sign-on session as synchronized with the master identity provider.

Figure 1:
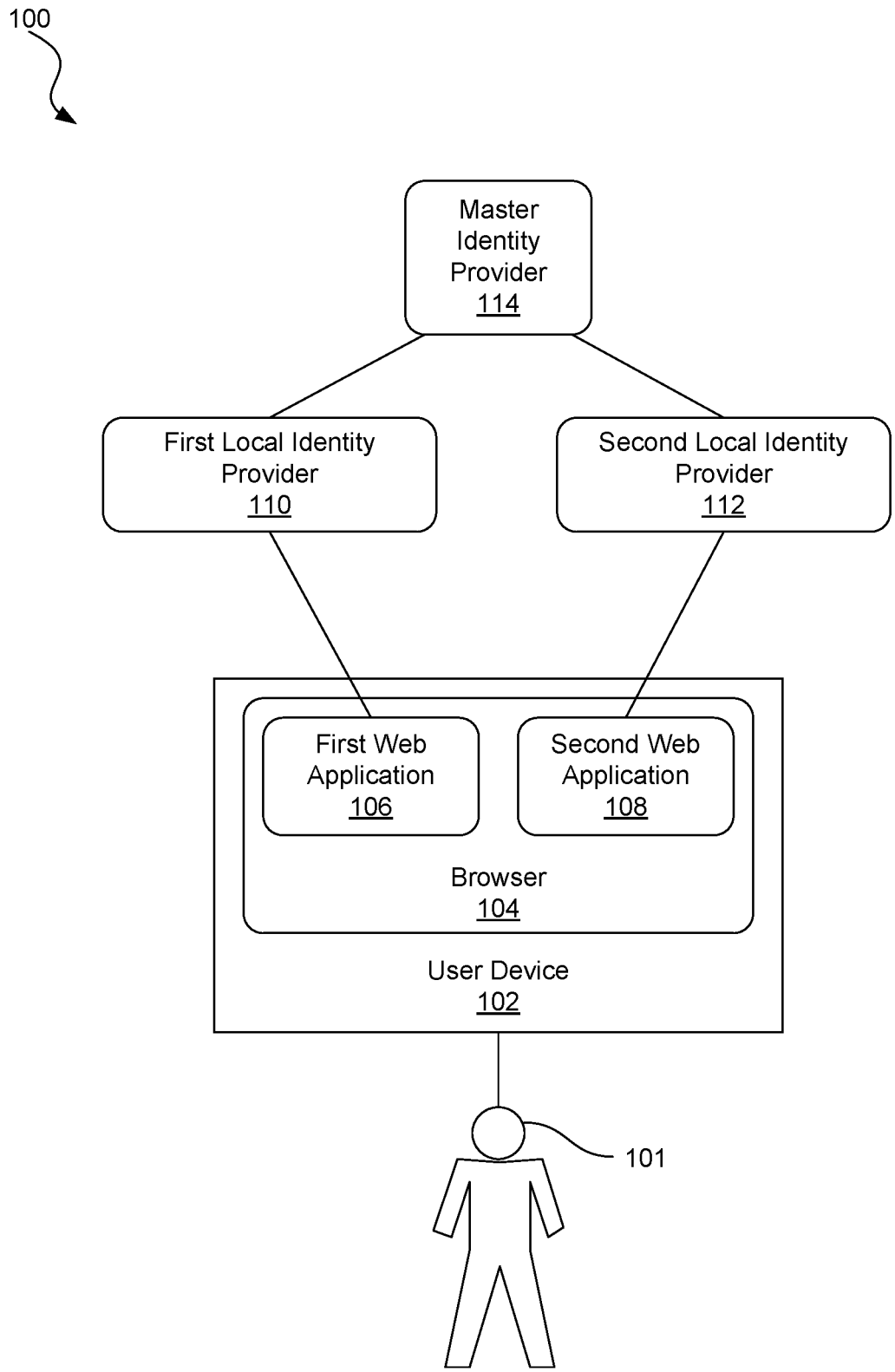
FIG. 1 is a diagram showing a plurality of local identity providers and a master identity provider, according to one example of principles described herein.

In the figures, elements having the same designations have the same or similar functions.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

In more complicated software solutions, management of single sign-on functionality can be difficult. For example, the performance of the identity provider may degrade for large systems. Moreover, it may be difficult for multiple large development teams to maintain an identity provider for multiple software systems. Moreover different software systems, such as different web applications, may often have different needs. Accordingly, it is desirable to more efficiently manage single sign-on technologies for large software environments.

According to principles described herein, instead of having a single identity provider that manages a single sign-on session for multiple software applications, a plurality of identity providers work with a master identity provider to provide single sign-on functionality for the multiple software applications. In one example, each of the different software applications may work with a different identity provider. For purposes of discussion the identity providers will be referred to as local identity providers to distinguish them from the master identity provider. The master identity provider may be transparent to the user. In other words, the user may only interact with the local identity providers. The local identity providers, in turn, may then work with the master identity provider.

In one example, a user may request a particular action through a web application running on a browser. The web application may then redirect the browser to a local identity provider associated with the web application. If there is already a single sign-on session in place for that web application, then no further action may be taken regarding authentication. However, if there is no local single sign-on session in place, the browser may be redirected to a master identity provider. If there is a master single sign-on session in place, the local identity provider may then be provided with the session identifier for the master single sign-on session. If there is no master single sign-on session in place, then one may be created. The local identity provider may then authenticate the user and the web application may proceed with that authentication. With the master single sign-on session in place, the user may use other applications that use other local identity providers that will then use the master single sign-on session.

Each separate local identity provider may be specially designed for a particular web application. This allows the local identity providers to better serve their respective web applications yet still work with each other to provide single sign-on functionality. By allowing each of the local identity providers to better serve their respective web applications, both the web applications and the identity providers may operate more efficiently. This allows the computer systems underlying the web applications and identity providers to make better use of computing resources and thus improve their performance.

A problem may arise, however, if the master identity provider is unavailable. For example, if the browser is redirected to the master identity provider and it is unavailable, an error may occur and the user will have a bad user experience. A solution to this problem may involve not redirecting the browser to the master identity provider if it is unavailable. The local identity provider may track the availability of the master identity provider and determine its availability. In an example, rather than redirect the browser to the master identity provider, each local identity provider of the plurality of local identity providers may process and handle their own local sessions while the master identity provider is unavailable. For example, a local identity provider may store an identifier of one or more local single sign-on sessions and/or the user's identity. At a later point in time when the master identity provider is available, the local identity provider synchronizes its identity and local session information with the master identity provider, which may then update its master single sign-on session. The master single sign-on session may eventually store a list of all the local single sign-on sessions associated with the plurality of local identity providers.

FIG. 1 is a diagram 100 showing a plurality of local identity providers 110, 112 and a master identity provider 114. According to the present example, a user device 102 includes a web browser 104. The web browser 104 runs a first web application 106 and a second web application 108. The first web application 106 is designed to authenticate with a first local identity provider 110. Similarly, a second web application 108 is designed to authenticate with a second local identity provider 112. Both the first local identity provider 110 and a second local identity provider 112 are in communication with a master identity provider 114.

The user device 102 may be one of a variety of electronic computing devices. For example, the user device 102 may be a desktop computing device, laptop computing device, tablet device, or a mobile phone device. The user device 102 thus provides output systems for display to a user 101 such as a monitor or touchscreen device. The user device 102 also provides input systems to receive information from the user such as a touchscreen, keyboard, or mouse.

The web browser 104 is a software application that runs on the user device 102. The web browser 104 obtains web content over a network such as the Internet. The web browser 104 then renders that content for display to a user. The web browser 104 is designed for use with various web technologies such as hypertext transfer protocol (HTTP), hypertext markup language (HTML), JavaScript, and other web technologies.

A web application is one that is designed to run through a browser. Web applications typically have a client/server architecture. Specifically, the web application acts as a client and communicates with a server over a network such as the Internet. Web applications may include email applications, e-commerce applications, instant messaging applications, and other various applications. Such web applications often require the user to log in using a username and password so as to create a secure session between the web application and the server with which it communicates. In some examples, two separate web applications may be related and may have a similar user base. In other words, the first web application 106 may be related to the second web application 108 such that a single sign-on session would be convenient for the user. In other words, it would be convenient for the user to log in through one web application and not have to log in to the other.

When a user logs in through a web application 106, 108, the web application is configured to use a local identity provider 110, 112. A local identity provider 110, 112 may be a software function that runs on one or more computing systems such as servers. An identity provider 110, 112 provides users with identifiers for interaction with the particular system. Thus, the identity provider can verify to the particular system that a particular identifier is known to the identity provider. The identity provider may use one of a variety of mechanisms to perform this task. For example, the identity provider may use a username and password system. Alternatively, the identity provider may use a client certificate. The identity provider may also use a social login. A social login is one that uses a social networking service to provide an identifier.

While the two local identity providers 110, 112 are separate, they may both rely on a master identity provider 114. For example, if a user logs in with the first local identity provider 110, the first local identity provider 110 may pass that login information to the master identity provider to create a master single sign-on session. When the user attempts to perform an action with the second application that requires authentication, the browser may consult the second local identity provider 112. In turn, the second local identity provider 112 may first consult the master identity provider and use the master session identifier to authenticate the user. Thus, even though different local identity providers are used, the single sign-on functionality can still be provided. The local identity providers use the master identity provider to coordinate single sign-on sessions between the applications communicating with the local identity providers. A local single sign-on session may store the local identifier that identifies the local single sign-on session and the user's identity. Interactions between a plurality of local identity providers and a master identity provider are described in prior U.S. patent application Ser. No. 15/722,339 to Elias, filed Oct. 2, 2017, entitled "Single Sign-On Management for Multiple Independent Identity Providers," which is incorporated herein by reference in its entirely.

In some examples, each of the local identity providers 110, 112 and the master identity provider 114 share the same user base. This user base may be shared using shared storage or replication. In some examples, any user interactions are done through the local identity providers 110, 112 only. The local identity providers 110, 112 then communicate with the master identity provider 114. In other words, the master identity provider 114 is completely transparent to the user. In some examples, after a local single sign-on session has been established between a web application 106, 108 and its local identity provider 110, 112, all authentication requests from the web application go through that local single sign-on session and the master single sign-on session is no longer used. In some examples, any communication between the web applications 106, 108 and the local identity providers 110, 112 are secured using protocols such as Security Assertion Markup Language (SAML), OpenID connect, and OAuth. Similarly, communication between the local identity providers 110, 112 and the master identity provider 114 are secured using such protocols. In some examples, either the local identity providers 110, 112 and/or the master identity provider 114 may use clustering to improve performance and resilience. In other words, either identity provider may be embodied as multiple server systems working in concert to provide their respective functionalities.

The master identity provider 114 may become unavailable, if for example, the server in which the master identity provider is running crashes. If this occurs, the system may become broken and the master identity provider 114 no longer able to provide coordination of the single sign-on sessions with the local identity providers. High availability (HA) techniques (e.g., HA clusters) may be used to maintain the availability of the master identity provider, but these techniques may not guarantee one-hundred percent availability. Accordingly, the local identity providers are no longer able to use the master identity provider. The present disclosure provides techniques to allow the system to continue to run smoothly despite the unavailability of the master identity provider. If a local identity provider determines that the master identity provider is unavailable, the local identity provider may process and handle a single sign-on session locally. The local identity provider may synchronize with the master identity provider when it later becomes available. In the present disclosure, if the master identity provider is unavailable, the local identity provider will not redirect the browser to the master identity provider because doing so may break the browser and ruin the user's experience.

FIGS. 2A-2D illustrate a flow diagram showing an example method 200 for managing sign-on sessions. According to the present example, the method 200 involves interactions between a browser 201, a web application 203, a local identity provider 205, and a master identity provider 207. The browser 201 may correspond to the browser 104 described above. Similarly, the web application 203 may correspond to one of the web applications 106, 108 described above. The local identity provider 205 may correspond to one of the local identity providers 110, 112 described above. The master identity provider 207 may correspond to the master identity provider 114.

According to the present example, at action 202, the browser 201 requests an action from the web application 203. For example, the user may enter a particular uniform resource locator (URL) into the browser. Such URL may be associated with the web application 203.

At action 204, the web application 203 may determine that an identity is required before the requested action can proceed. For example, the web application 203 may determine the action requested should be secure and the identity of the person requesting the action should be verified. Accordingly, the web application 203 redirects the browser 201 to the local identity provider 205 at action 206.

At action 208, the local identity provider 205 determines whether a local single sign-on session exists. A local single sign-on session may already exist, for example, if the user has already logged in or otherwise authenticated with the local identity provider 205. This may have been done through the web application 203 or another web application running on the browser 201.

If it is determined at action 208 that no local single sign-on session exists, the local identity provider 205 determines whether a master identity provider is available at action 210. Each local identity provider may track an availability of the master identity provider. The tracking may be done by, for example, periodical background pooling of the master identity provider by requests from a local identity provider to check and know the master identity provider's availability, monitoring of the master identity provider availability by an external system that provides the availability of the master identity provider to a plurality of local identity providers, and/or a synchronous request from the local identity provider to the master identity provider to check its availability when the local identity provider requests it. The master identity provider and/or external system may respond to requests by the local identity provider regarding availability of the master identity provider.

Figure 2A:
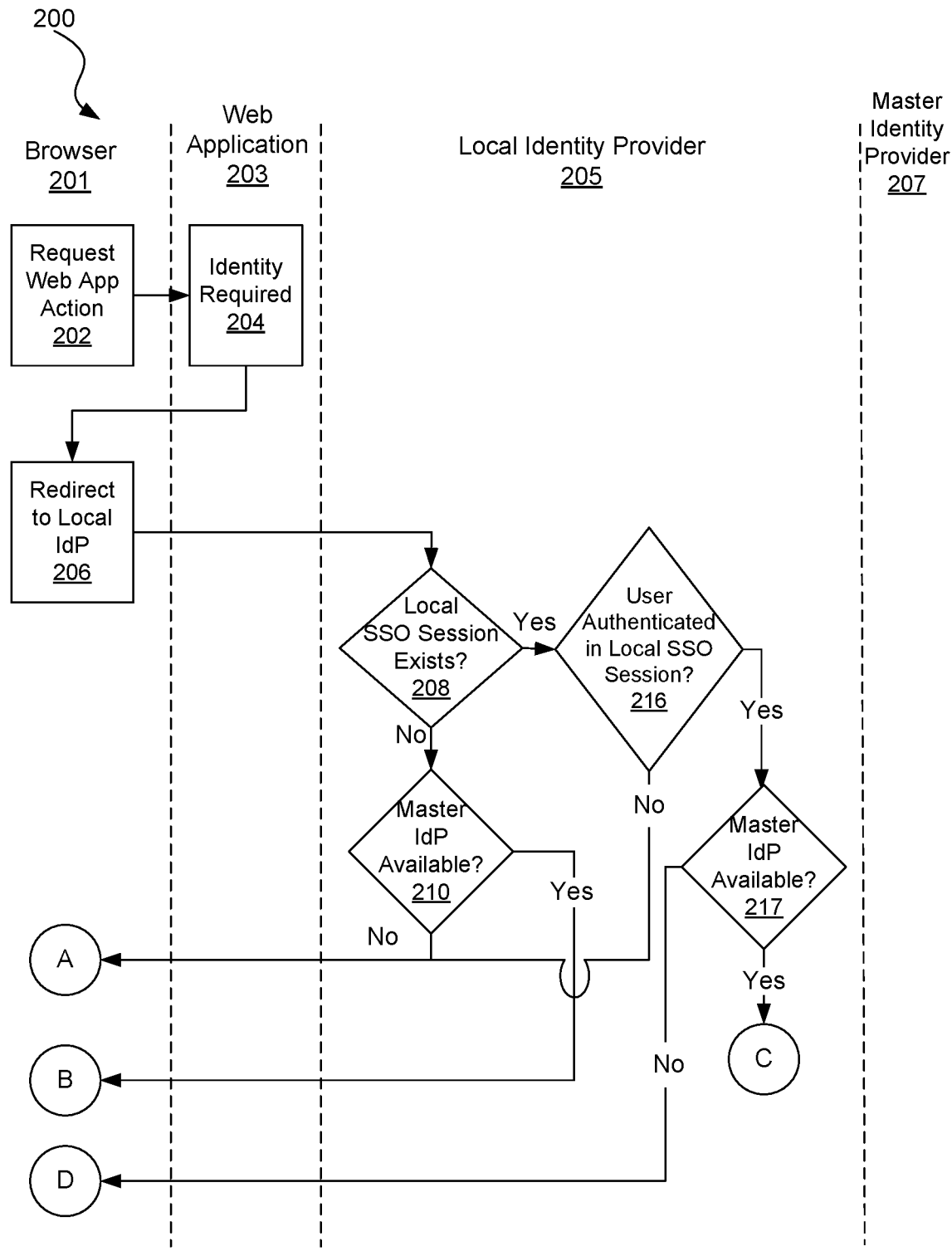
FIGS. 2A-2D illustrate a flow diagram showing an example method for managing sign-on sessions, according to one example of principles described herein.
Figure 2B:
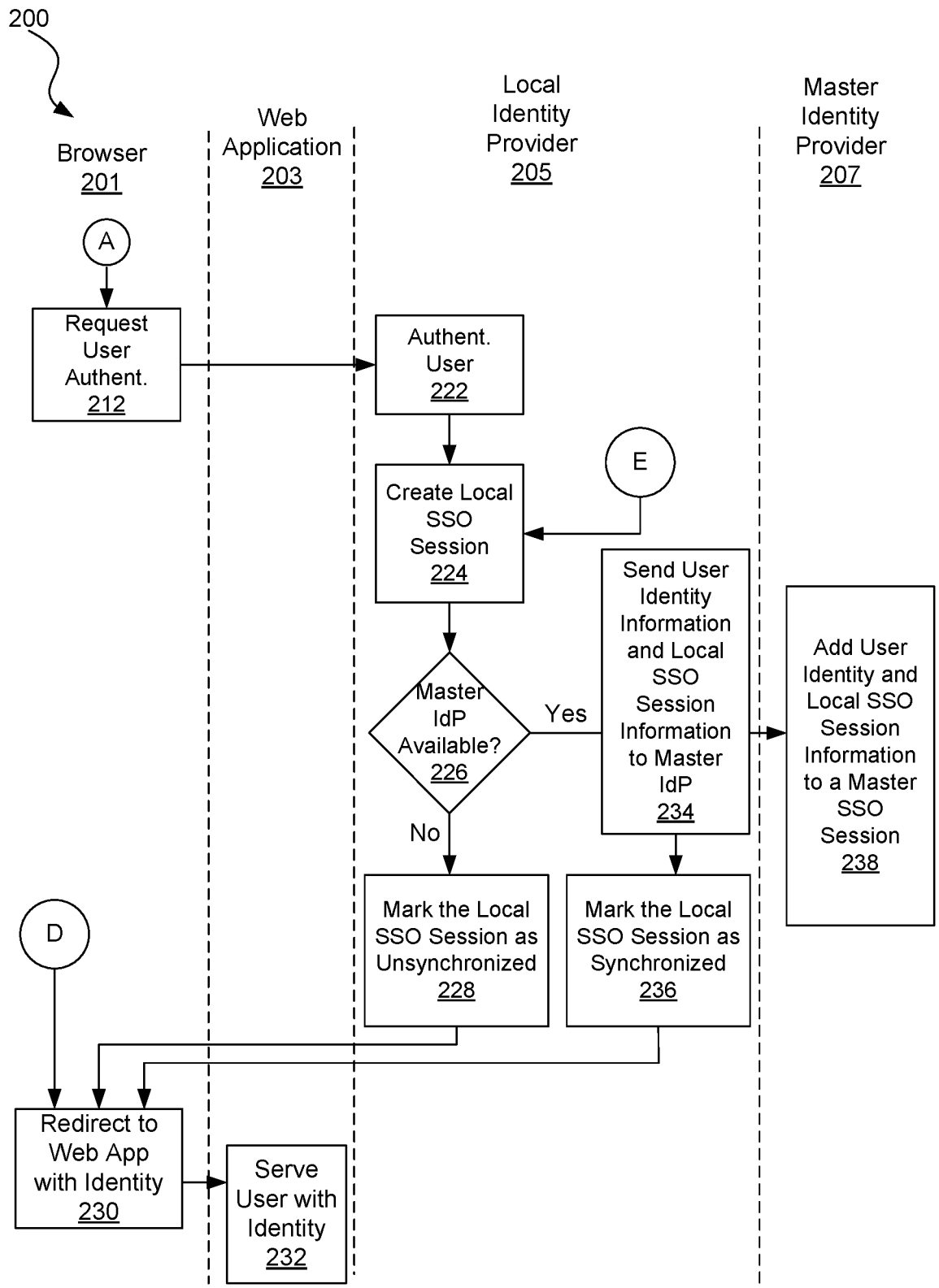
Figure 2C:
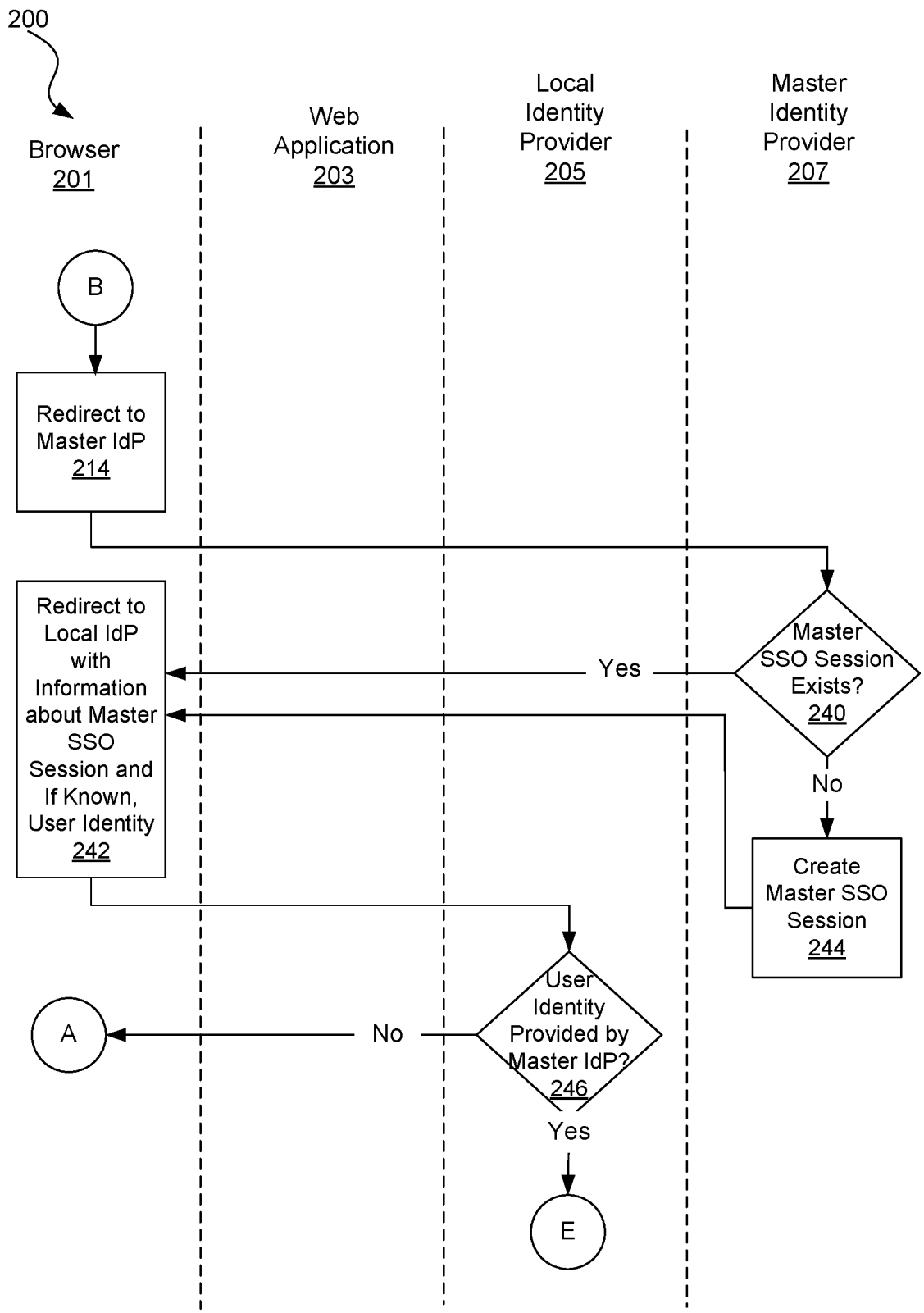

If it is determined at action 210 that the master identity provider is unavailable, the browser 201 requests authentication from the user at action 212, which is illustrated in FIG. 2B. For example, the browser 201 may prompt the user for a username and password. Other means of authentication are also contemplated. If it is determined at action 210 that the master identity provider is available, the local identity provider 205 redirects the browser 201 to the master identity provider 207 at action 214, which is illustrated in FIG. 2C. Both FIGS. 2B and 2C will be addressed further below.

Referring back to FIG. 2A, if it is determined at action 208 that the local single sign-on session exists, the method 200 proceeds to action 216. At action 216, the local identity provider 205 determines whether a user has been authenticated in the local single sign-on session. If it is determined at action 216 that a user has not been authenticated in the local single sign-on session, the browser 201 requests authentication from the user at action 212, which is illustrated in FIG. 2B. If it is determined at action 216 that the user has been authenticated in the local single sign-on session, the local identity provider 205 determines whether the master identity provider is available at action 217.

Figure 2D:
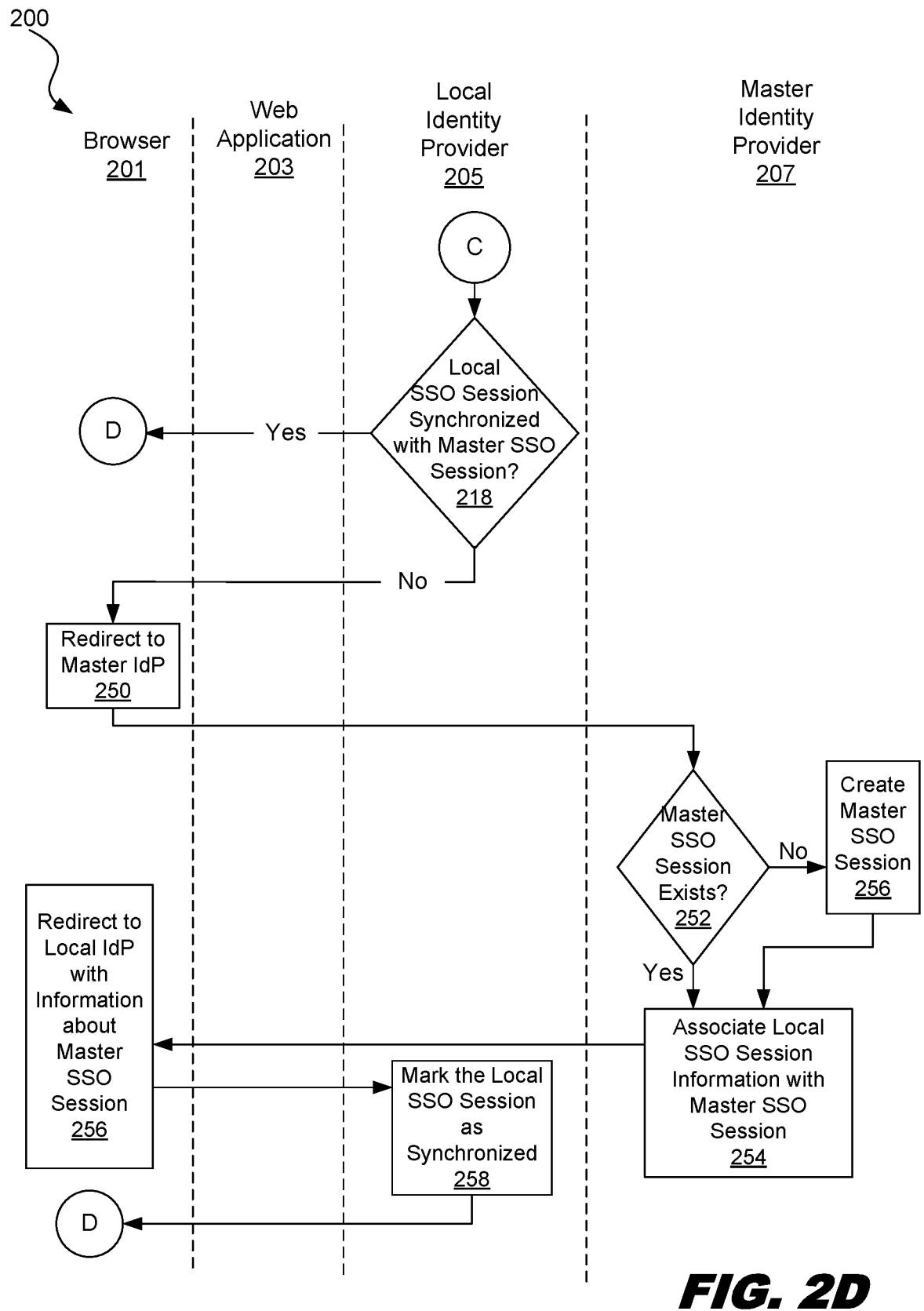

If it is determined at action 217 that the master identity provider is available, the local identity provider 205 determines whether the local single sign-on session is synchronized with a master single sign-on session at action 218, which is illustrated in FIG. 2D. FIG. 2D will be addressed further below. The synchronization of a local single sign-on session with the master single sign-on session may also be referred to as the synchronization of the local single sign-on session with the master identity provider that created the master single sign-on session. If it is determined at action 217 that the master identity provider is unavailable, the local identity provider 205 redirects the browser 201 back to the web application 203 with the user's identity at action 230, which is illustrated in FIG. 2B.

In FIG. 2B, at action 212, the browser 201 requests authentication from the user. At action 222, the local identity provider 205 authenticates the user using the credentials provided by the user. For example, the user may enter a username and password. Other means of authentication are also contemplated. The local identity provider 205 may store the username, user identity, etc., into a memory. As discussed further in the disclosure, the same user information (e.g., username, user identity, etc.) may eventually be stored in the browser 201 or a cookie file. A cookie file is a small file that is stored on a user's computer. The cookie file is designed to hold a modest amount of data specific to a particular client and website, and can be accessed either by the web server or the client computer.

After the user has been authenticated, the local identity provider 205 creates a local single sign-on session between the local identity provider and the browser at action 224. In such case, the local single sign-on session may be created without identity, and the identity may be added at a subsequent time, such as after authentication action 222 or after the identity is received from the master identity provider in action 242.

The local identity provider 205 may handle the local single sign-on session without communicating with the master identity provider 207. In an example, the local identity provider 205 creates a local identifier of the local single sign-on session and stores the identifier into a memory. As discussed further in the disclosure, the same identifier may eventually be stored in the browser 201 or a cookie file.

At action 226, it is determined whether the master identity provider is available. If it is determined at action 226 that the master identity provider is unavailable, the method 200 proceeds to action 228. At action 228, the local identity provider 205 marks the local single sign-on session as unsynchronized with the master identity provider. In an example, the local identity provider maintains a list of unsynchronized local single sign-on sessions, the list containing identifiers of one or more local single sign-on sessions that have not been synchronized with the master identity provider.

After the local single sign-on session is marked as unsynchronized, the local identity provider 205 redirects the browser 201 back to the web application 203 with the user's identity at action 230. The browser 201 may remember the local session identifier of the local single sign-on session at this point for subsequent use (e.g., in action 208 of future interactions). Additionally, if the browser 201 is directed to the local identity provider 205, the local identity provider may read the local identifier of the local single sign-on session from the memory (e.g., cookie file), and can find the local single sign-on session. Other information that the local identity provider 205 may store are the username, user identity, etc. At action 232, the web application 203 can then serve the user as intended using the user's identity.

If it is determined at action 226 that the master identity provider is available, the method 200 proceeds to action 234. At action 234, the local identity provider 205 sends the user identity information and local single sign-on session information to master identity provider 207. In some examples, this is done through a front channel. In other words, the local identity provider 205 provides information to the browser 201, which then sends the information to the master identity provider 207. In some examples, a back channel may be used. In other words, the local identity provider 205 may transmit the information directly to the master identity provider 207. The master identity provider 207 may receive a list of unsynchronized local single sign-on sessions and associate the master session information with the local single sign-on session information and user identity. The local single sign-on session information may include the identifier of the local single sign-on session.

In an example, at action 234, the local identity provider synchronizes one or more local single sign-on sessions with a master single sign-on session. The local identity provider 205 may maintain a list of unsynchronized local single sign-on sessions and send the list to the master identity provider 207 for synchronization with the master single sign-on session. At action 238, the master identity provider 207 may synchronize the local single sign-on session with the master single sign-on session by adding the user identity and local single sign-on session information to the master single sign-on session.

At action 236, the local identity provider 205 marks the local single sign-on session as synchronized with the master identity provider. In keeping with the above example, for each local single sign-on session that is marked as synchronized, the local identity provider 205 may remove the identifier of the respective local single sign-on session from the list of unsynchronized local single sign-on sessions.

In FIG. 2C, at action 214, the local identity provider 205 redirects the browser 201 to the master identity provider 207. At action 240, the master identity provider 207 determines whether a master single sign-on session exists for the user. The master identity provider 207 may maintain a master single sign-on session for each particular user. A master single sign-on session may already exist, for example, if the user has already authenticated with a different local identity provider and that different local identity provider provided the master identity provider 207 with single sign-on session information. The different local identity provider may have interacted with the master identity provider 207 in the manner described herein to create the master single sign-on session.

If it is determined at action 240 that the master single sign-on session already exists, then the method 200 proceeds to action 242. At action 242, the master identity provider 207 redirects the browser 201 to the local identity provider 205 with information about the master single sign-on session (e.g., identifier of the master single sign-on session) and if known, the user identity. In an example, the local single sign-on session stores the identifier of the local single sign-on session, a link to the master single sign-on session (e.g., the identifier of the master single sign-on session), and if known, the user identity.

In some examples, the master identity provider 207 may be aware of the identity of the user attempting to access the web application 203. However, in some examples, the master identity provider may not be aware of the user's identity. The browser 201 may receive the master session identifier and/or the identity of the user from the master identity provider 207. As discussed further in the present disclosure, both the master session identifier and the user identity may eventually be provided to the local identity provider 205.

If it is determined at action 240 that no master single sign-on session already exists, the method 200 proceeds to action 244. At action 244, the master identity provider 207 creates a master single sign-on session. Any subsequent requests from the browser 201 to authenticate the user can use this master single sign-on session information. In an example, to create a master single sign-on session, the browser 201 is redirected to the master identity provider after the local single sign-on session has been created. After the new master single sign-on session is created, the master identity provider 207 may provide the browser 201 with the master session identifier. The master session identifier may be a randomly generated numeric or alphanumeric string value that identifies a particular session. After the master identity provider 207 creates the master single sign-on session, the method 200 proceeds to action 242.

The browser 201 remembers the information about the master single sign-on session (e.g., master session identifier) for subsequent use (e.g., in action 210 of future interactions) and may be redirected to the local identity provider 205. After action 242, the method 200 proceeds to action 246, where the local identity provider 205 determines whether the user's identity is provided by the master identity provider 207. If it is determined at action 246 that the user's identity is not provided by the master identity provider 207, the local identity provider 205 redirects the browser 201 to request authentication from the user at action 212, which is illustrated in FIG. 2B. If it is determined at action 246 that the user's identity is provided by the master identity provider 207, the local identity provider 205 creates the local single sign-on session at action 224, thus skipping the authentication steps 212, 222 illustrated in FIG. 2B.

In FIG. 2D, at action 218, the local identity provider 205 determines whether the local single sign-on session is synchronized with the master single sign-on session. The local single sign-on session is synchronized with the master single sign-on session if the master identity provider has associated the local single sign-on session information with the master single sign-on session. In an example, the local single sign-on session is not synchronized with a master single sign-on session if an identifier of the local single sign-on session is contained in the list of unsynchronized local single sign-on sessions.

If it is determined at action 218 that the local single sign-on session is synchronized with the master single sign-on session, the local identity provider 205 redirects the browser 201 back to the web application 203 with an identity for the user of the user device at action 230, which is illustrated in FIG. 2B. If it is determined at action 218 that the local single sign-on session is not synchronized with the master single sign-on session, the local identity provider 205 redirects the browser 201 to the master identity provider 207 at action 250. In an example, the local identity provider 205 redirects the browser to a server system associated with the master identity provider.

After action 250, the method 200 proceeds to action 252. At action 252, the master identity provider 207 determines whether a master single sign-on session exists. If it is determined at action 252 that the master single sign-on session already exists, the master identity provider 207 associates the local single sign-on session information and/or user identity with the master single sign-on session at action 254. The master identity provider may maintain the master single sign-on session, which stores a list of the local single sign-on sessions for a user whom the master identity provider may authenticate without requesting credentials from the user. The master identity provider may maintain a master single sign-on session for each user.

If it is determined at action 252 that the master single sign-on session does not already exist, the master identity provider 207 creates the master single sign-on session at action 256. Any subsequent requests from the browser 201 to authenticate the user can use this master single sign-on session information. After action 256, the method 200 proceeds to action 254.

After action 254, the method 200 proceeds to action 256, where the master identity provider 207 redirects the browser 201 to the local identity provider 205 with information about the master single sign-on session. In an example, the master identity provider 207 may provide the browser with an identifier of the master single sign-on session. The browser 201 may remember the identifier of the master single sign-on session at this point for subsequent use (e.g., in action 252 of future interactions).

At action 258, the local identity provider 205 marks the local single sign-on session as synchronized with the master identity provider 207. After the local identity provider 205 marks the local single sign-on session as synchronized, the method 200 proceeds to action 230, which is illustrated in FIG. 2B.

The method 200 described above may also be used with passive authentication. In such examples, the web application may check whether the user identity is known and whether the single sign-on session exists. If no single sign-on session exists, the user may not be prompted for credentials. Instead, the web application 203 may proceed without the user's identity if a master single sign-on session that is associated with the local identity provider exists. The user identity may be checked in both the local identity provider and the master identity provider.

Figure 3:
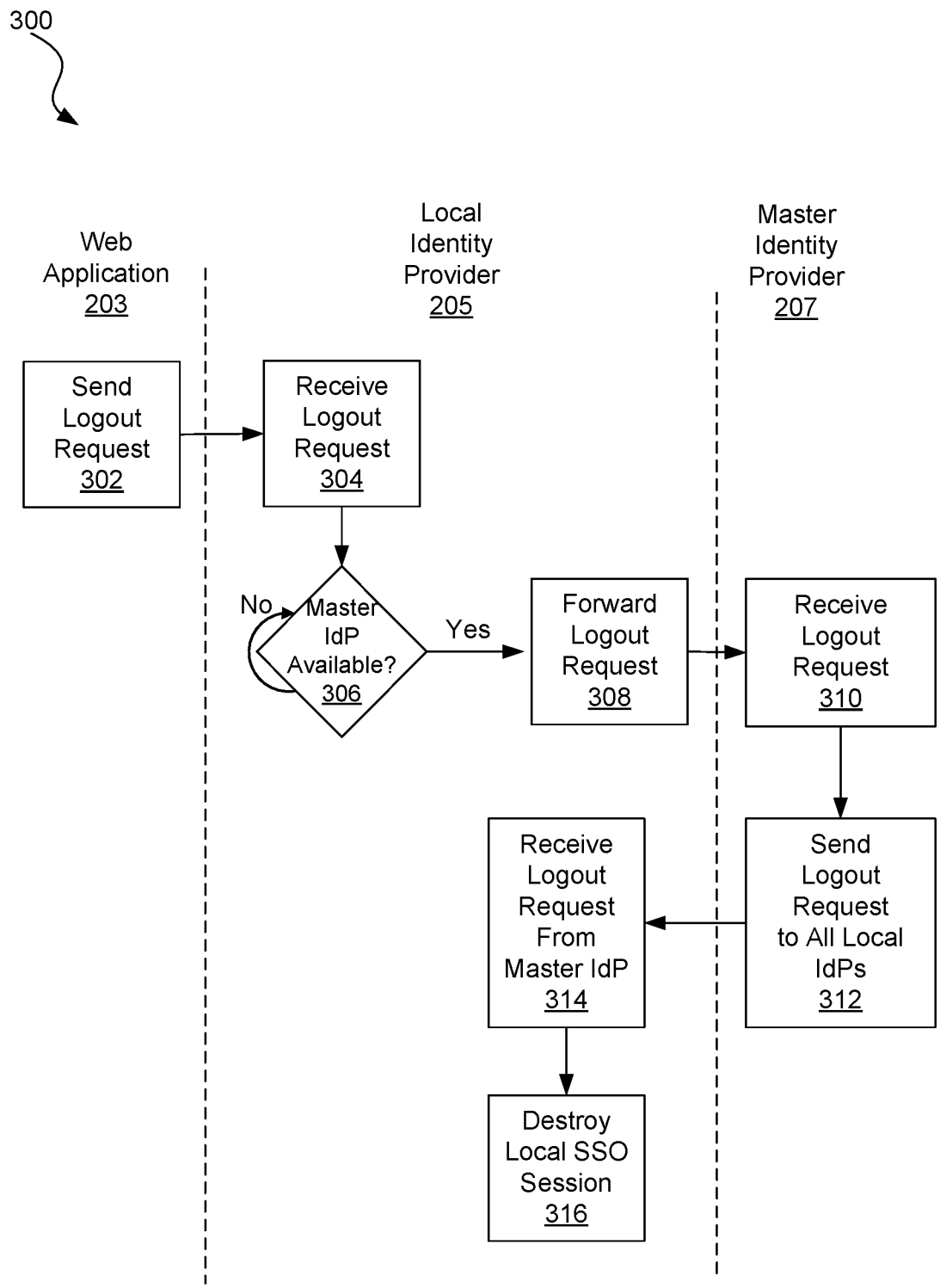
FIG. 3 is a flow diagram showing an illustrative method for a logout process, according to one example of principles described herein.

FIG. 3 is a flow diagram showing an illustrative method 300 for a logout process. According to the present example, the method 300 involves the web application 203, the local identity provider 205, and the master identity provider 207. In the present example, the method 300 begins at action 302, where the web application 203 sends a logout request. This logout request is sent to the local identity provider 205. At action 304, the local identity provider 205 receives the logout request. At action 306, the local identity provider 205 determines whether a master identity provider is available.

If it is determined at action 306 that the master identity provider is unavailable, the local identity provider may wait for a period of time and then again determine whether the master identity provider is available. If it is determined at action 306 that the master identity provider is available, the local identity provider forwards the logout request to the master identity provider at action 308. At action 310, the master identity provider receives the logout request. Both a front channel and/or a back channel method may be used here if the master identity provider is available. The back channel may be used if it is desirable to wait until the master identity provider becomes available.

At action 312, the master identity provider 207 sends the logout request to each of the local identity providers associated with that master identity provider 207. Thus, the logout request is sent to the local identity provider 205, and any other local identity providers associated with the master identity provider 207. The master identity provider may then destroy the master single sign-on session.

At action 314, the local identity provider 205 receives the logout request from the master identity provider. At action 316, the local identity provider 205 destroys the local single sign-on session indicated by the logout request. Any other local identity providers that receive the logout request from the master identity provider will also destroy any local single sign-on sessions associated with those local identity providers. The master identity provider may also destroy the master single sign-on session. In some examples, the master identity provider maintains an association between the master single sign-on session and the local sign-on sessions. This allows the master identity provider to logout of all local identity single sign-on sessions.

In some examples, with the computing system, the local identity provider 205 receives a logout request from the web application 203 and determines that a master identity provider 207 associated with the plurality of local identity providers is unavailable. After determining that the master identity provider is unavailable, the local identity provider 205 determines that the master identity provider is available. With the computing system, in response to determining that the master identity provider is available, the local identity provider 205 forwards the logout request to the master identity provider. The local identity provider 205 receives the logout request from the master identity provider. With the computing system, in response to receiving the logout request from the master identity provider 207, the local identity provider 205 destroys the local single sign-on session in response to an instruction from the master identity provider.

Figure 4:
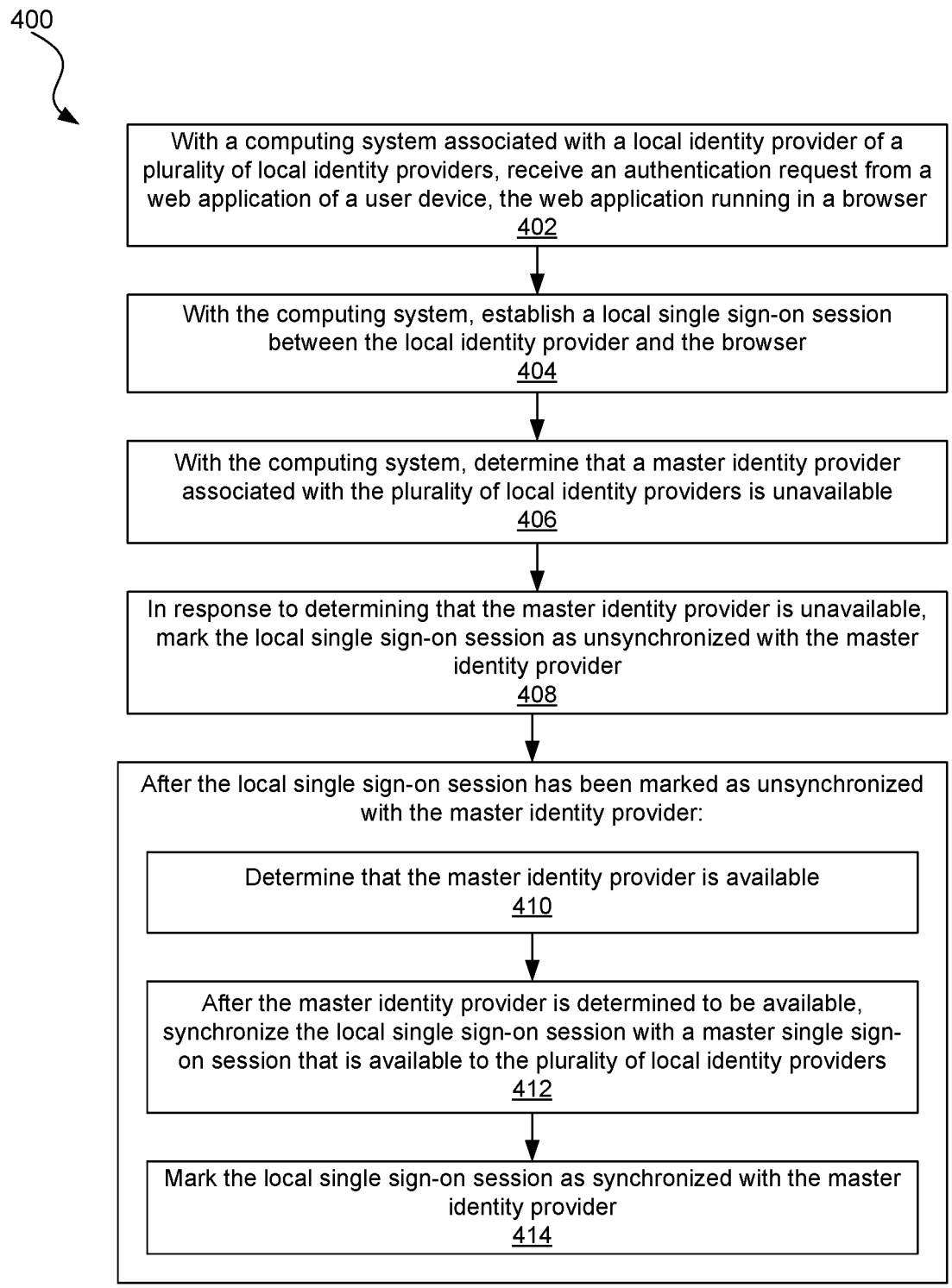
FIG. 4 is a flowchart showing an illustrative method for processing an availability of a master identity provider, according to one example of principles described herein.

FIG. 4 is a flowchart showing an illustrative method 400 for processing an availability of a master identity provider. The method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof.

In FIG. 4, at action 402, with a computing system associated with a local identity provider of a plurality of local identity providers, the local identity provider 205 receives an authentication request from a web application of a user device, the web application running in a browser.

At action 404, with the computing system, the local identity provider 205 establishes a local single sign-on session between the local identity provider and the browser. The local identity provider 205 may establish the local single sign-on session by, for example, creating the local single sign-on session or identifying a local single sign-on session that already exists. The local single sign-on session may include an identifier of the local single sign-on session. The local session identifier may be a randomly generated numeric or alphanumeric string value that identifies a particular session.

At action 406, with the computing system, the local identity provider 205 determines that a master identity provider associated with the plurality of local identity providers is unavailable. The local identity provider 205 may track which local single sign-on sessions were created while the master identity provider is unavailable. Each local single sign-on session may contain information about the user and the identifier of the particular local single sign-on session.

At action 408, in response to determining that the master identity provider is unavailable, the local identity provider 205 marks the local single sign-on session as unsynchronized with the master identity provider. The local identity provider may perform this marking by inserting an identifier of the local single sign-on session into a list of unsynchronized local single sign-on sessions.

After the local single sign-on session has been marked as unsynchronized with the master identity provider, the local identity provider 205 performs actions 410, 412, and 414. At action 410, the local identity provider 205 determines that the master identity provider is available. At action 412, after determining that the master identity provider is available, the local identity provider 207 synchronizes the local single sign-on session with a master single sign-on session that is available to the plurality of local identity providers. The local identity provider 205 may maintain a list of unsynchronized local single sign-on sessions and send the list to the master identity provider to for synchronization with the master single sign-on session. The master identity provider 207 may receive the list and associate the local single sign-on session information and user identity with the master session information. In an example, the local identity provider synchronizes the local single sign-on session with the master single sign-on session by sending the local session identifier and the user identity to the master identity provider.

In an example, for each local single sign-on session identifier contained in the list, the master identity provider may determine whether it has a master single sign-on session for the user for the local single sign-on session. If so, the master identity provider adds the information about the local single sign-on session into the master single sign-on session and informs the local identity provider about the existing master single sign-on session. The local identity provider may receive the master single sign-on session information At action 414, the local identity provider 207 marks the local single sign-on session as synchronized with the master identity provider. The local identity provider may perform this marking by removing the identifier from the list of unsynchronized local single sign-on sessions. Actions 412 and 414 may be performed for each local single sign-on session that the local identity provider has marked as unsynchronized with a master identity provider.

It is also understood that additional processes may be inserted before, during, or after blocks 402-414 discussed above. It is also understood that one or more of the blocks of method 400 described herein may be omitted, combined, or performed in a different sequence as desired.

In an example, with the computing system associated with a second local identity provider of the plurality of local identity providers, the second local identity provider receives a second authentication request from a second web application of the user device, the second web application running in the browser. With the computing system, the second local identity provider establishes a second local single sign-on session between the second local identity provider and the browser. The second local single sign-on session may store a second local identifier that identifies the second local single sign-on session.

In response to a determination that the master identity provider is unavailable, the second local identity provider marks the second local single sign-on session as unsynchronized with the master identity provider. After marking the second local single sign-on session as unsynchronized with the master identity provider and determining that the master identity provider is available, the second local identity provider synchronizes the second local single sign-on session with the master single sign-on session and marks the second local single sign-on session as synchronized with the master identity provider. The second local identity provider may synchronize the second local single sign-on session with the master single sign-on session by sending the master identity provider the second local identifier and/or the identity for a user of the user device.

Figure 5:
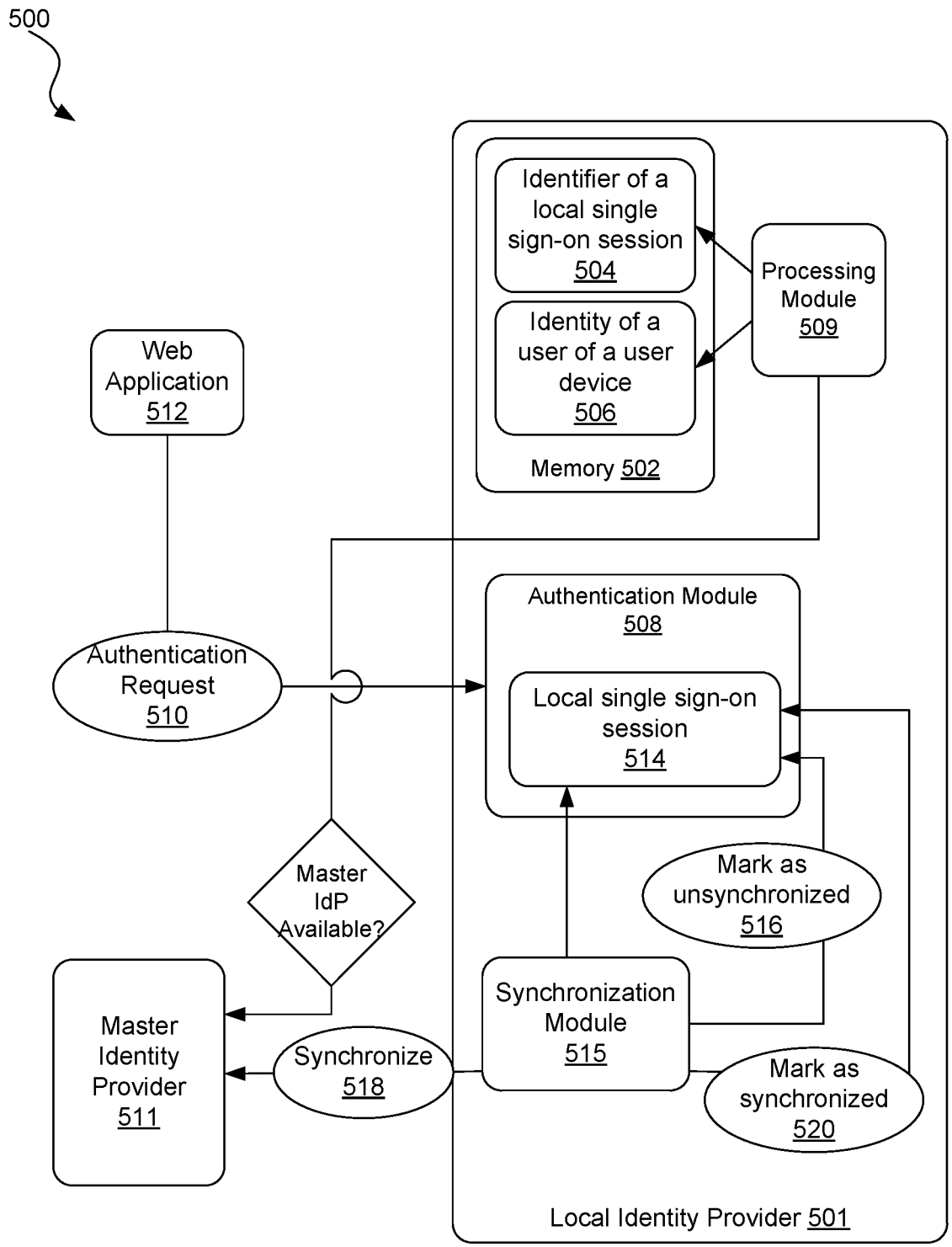
FIG. 5 illustrates an example system diagram for processing an availability of a master identity provider, according to one example of principles described herein.

FIG. 5 illustrates an example system diagram 500 for processing an availability of a master identity provider. In FIG. 5, the local identity provider 501 includes a memory 502 storing an identifier 504 and an identity 506. The identifier 504 identities a local single sign-on session, and the identity 506 identities a user of the user device.

The local identity provider 501 includes an authentication module 508 and a processing module 509. The authentication module 508 receives an authentication request 510 from a web application 512 of a user device and establishes a local single sign-on session 514. The local single sign-on session 514 is between the local identity provider 501 and a browser in which the web application 512 runs.

The processing module 509 may track an availability of a master identity provider 511 associated with a plurality of local identity providers and determine whether the master identity provider 511 is available. In an example, the processing module 509 determines that the master identity provider 511 is unavailable and thus does not redirect the browser to the master identity provider. Rather, the processing module 509 processes the local single sign-on session and stores the identifier 504 session and/or the identity 506 into the memory 502.

The local identity provider 501 also includes a synchronization module 515. In response to determining that the master identity provider is unavailable, at action 516, the synchronization module 515 marks the local single sign-on session as unsynchronized with the master identity provider. After the local single sign-on session is marked as unsynchronized with the master identity provider, the processing module 509 determines that the master identity provider is available. After a determination that the processing module 509 is available, the synchronization module 515 synchronizes the local single sign-on session with a master single sign-on session that is available to the plurality of local identity providers at action 518. In an example, the synchronization module 515 synchronizes these two sessions by sending the identifier 504 and/or the identity of the user of the user device to the master identity provider 511. After the local single sign-on session and the master single sign-on session are synchronized, the synchronization module 515 marks the local single sign-on session as synchronized with the master identity provider at action 520.

Figure 6:
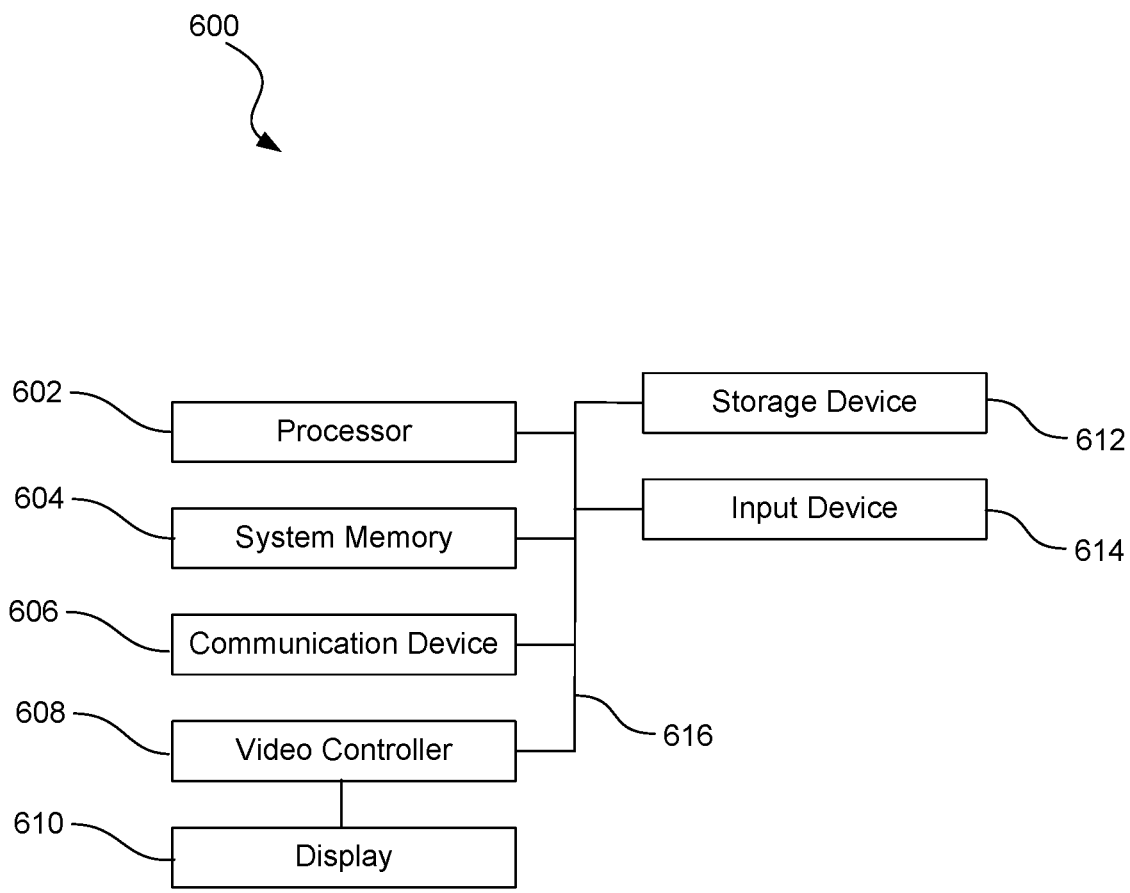
FIG. 6 is a diagram showing an illustrative computing system for single sign-on management, according to one example of principles described herein.

FIG. 6 is a diagram showing an illustrative computing system for single sign-on management. For example, the computing system 600 may be associated with a server underlying either a local identity provider or a master identity provider. Additionally, the computing system 600 may be associated with the user device running web applications that interact with the local identity provider.

According to the present example, the computing system 600 includes a processor 602, an input device 614, a storage device 612, a video controller 608, a system memory 604, a display 610, and a communication device 606, all of which are interconnected by one or more buses 616.

The storage device 612 may include a computer readable medium that can store data. The storage device 612 may include volatile memory storage devices such as Random Access Memory (RAM) as well as non-volatile memory storage devices such as solid state memory components. The computer readable medium may be a non-transitory tangible media.

In some examples, the communication device 606 may include a modem, network card, or any other device to enable the computing system 600 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 600 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary examples, software encompasses any set of instructions capable of being executed on a computing device such as, for example, on a client machine or server.

In some examples, combinations of software and hardware could also be used for providing enhanced functionality and performance for certain examples of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary examples of the present disclosure may be embodied in the RAM of a computing device to transform a standard computer into a new specific computing machine. In some examples, data structures are defined organizations of data that may enable an example of the present disclosure. In an exemplary example, a data structure may provide an organization of data, or an organization of executable code.

In some examples, a network and/or one or more portions thereof may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary examples, data may be mapped. In some examples, mapping is the process of associating one data entry with another data entry. In an exemplary example, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary examples, more than one database may be implemented.

In some examples, a computer program, such as a plurality of instructions stored on a computer readable medium, such as the computer readable medium, the system memory 604, and/or any combination thereof, may be executed by a processor 602 to cause the processor 602 to carry out or implement in whole or in part the operation of the computing system 600, one or more of the methods. In some examples, such a processor 602 may execute the plurality of instructions in connection with a virtual computer system.

Some examples of processing systems described herein may include non-transitory, tangible, machine readable media that include executable code that when run by one or more processors (e.g., processor 602) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative examples have been shown and described, a wide range of modification, change and substitution is contemplated in the foregoing disclosure and in some instances, some features of the examples may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method of synchronizing sessions, comprising:
with a computing system associated with a local identity provider of a plurality of local identity providers, receiving an authentication request from a web application of a user device, the web application running in a browser;
with the computing system, establishing a local single sign-on session between the local identity provider and the browser;
with the computing system, determining that a master identity provider associated with the plurality of local identity providers is unavailable;
in response to determining that the master identity provider is unavailable, marking the local single sign-on session as unsynchronized with the master identity provider; and
after marking the local single sign-on session as unsynchronized with the master identity provider:
determining that the master identity provider is available;
after determining that the master identity provider is available, synchronizing the local single sign-on session with a master single sign-on session that is available to the plurality of local identity providers; and
marking the local single sign-on session as synchronized with the master identity provider.

2. The method of claim 1, further comprising:
with the computing system associated with a second local identity provider of the plurality of local identity providers, receiving a second authentication request from a second web application of the user device, the second web application running in the browser;
with the computing system, establishing a second local single sign-on session between the second local identity provider and the browser;
in response to a determination that the master identity provider is unavailable, marking the second local single sign-on session as unsynchronized with the master identity provider; and
after marking the second local single sign-on session as unsynchronized with the master identity provider:
after determining that the master identity provider is available, synchronizing the second local single sign-on session with the master single sign-on session; and
marking the second local single sign-on session as synchronized with the master identity provider.

3. The method of claim 1, wherein synchronizing the local single sign-on session with the master single sign-on session includes sending an identity for a user of the user device and local single sign-on session information to the master identity provider.

4. The method of claim 3, wherein the local single sign-on session information includes an identifier of the local single sign-on session.

5. The method of claim 1, wherein the marking the local single sign-on session as unsynchronized with the master identity provider includes inserting an identifier of the local single sign-on session into a list of unsynchronized local single sign-on sessions, and wherein the marking the local single sign-on session as synchronized with the master identity provider includes removing the identifier from the list of unsynchronized local single sign-on sessions.

6. The method of claim 1, further comprising:
determining whether the local single sign-on session exists; and
in response to a determination that the local single sign-on session does not exist and in response to the determination that the master identity provider is unavailable:
requesting, by the local identity provider, authentication credentials from the browser; and receiving the authentication credentials from the browser, wherein establishing the local single sign-on session includes determining, by the local identity provider, that a user of the user device has been successfully authenticated and creating the local single sign-on session between the local identity provider and the browser.

7. The method of claim 1, further comprising:
in response to a determination that the local single sign-on session exists, determining whether a user has been successfully authenticated in the local single sign-on session;
in response to a determination that the user has been successfully authenticated in the local single sign-on session and in response to determining that the master identity provider is available:
determining whether the local single sign-on session is synchronized with the master identity provider;
in response to a determination that the local single sign-on session is synchronized with the master identity provider, redirecting the browser to the web application with an identity for the user of the user device;
in response to a determination that the local single sign-on session is not synchronized with the master identity provider:
redirecting the browser to a server system associated with the master identity provider;
with the computing system, receiving from the browser, a master session identifier provided by the master identity provider, the master session identifier identifying the master single sign-on session that is available to the plurality of local identity providers; and
marking the local single sign-on session as synchronized with the master identity provider; and
redirecting the browser to the web application with an identity for the user of the user device.

8. The method of claim 7, further comprising:
in response to a determination that the user has been successfully authenticated in the local single sign-on session and in response to determining that the master identity provider is not available, redirecting the browser to the web application with the identity for the user of the user device.

9. The method of claim 1, further comprising:
after determining that the master identity provider is available, determining whether the local single sign-on session is synchronized with the master single sign-on session;
in response to a first determination that the local single sign-on session is not synchronized with the master single sign-on session:
redirecting the browser to a server system associated with the master identity provider; and
with the computing system, receiving, from the browser, a master session identifier provided by the master identity provider, the master session identifier identifying the master single sign-on session,
wherein synchronizing the local single sign-on session with the master single sign-on session includes in response to a determination that the local single sign-on session is not synchronized with the master single sign-on session, synchronizing the local single sign-on session with the master single sign-on session; and in response to a second determination that the local single sign-on session is synchronized with the master single sign-on session, redirecting the browser to the web application with an identity for the user of the user device.

10. The method of claim 1, further comprising:
after marking the local single sign-on session as unsynchronized with the master identity provider, redirecting the browser to the web application with an identity for the user of the user device.

11. The method of claim 1, further comprising:
with the computing system, tracking an availability of the master identity provider.

12. The method of claim 1, further comprising:
with the computing system, receiving a logout request from the web application;
with the computing system, determining that a master identity provider associated with the plurality of local identity providers is unavailable;
after determining that the master identity provider is unavailable, determining that the master identity provider is available;
with the computing system, in response to determining that the master identity provider is available, forwarding the logout request to the master identity provider; and
with the computing system, receiving the logout request from the master identity provider.

13. The method of claim 12, further comprising:
with the computing system, in response to receiving the logout request from the master identity provider, destroying the local single sign-on session in response to an instruction from the master identity provider.

14. A system for synchronizing sessions, comprising:
a memory storing an identifier of a local single sign-on session and an identity of a user of a user device;
an authentication module that receives an authentication request from a web application of a user device and establishes a local single sign-on session between a local identity provider and a browser in which the web application runs;
a processing module that determines that a master identity provider associated with a plurality of local identity providers is unavailable and stores the identifier of the local single sign-on session and the identity of the user into the memory; and
a synchronization module that in response to determining that the master identity provider is unavailable, marks the local single sign-on session as unsynchronized with the master identity provider,
wherein after the local single sign-on session is marked as unsynchronized with the master identity provider, the processing module determines that the master identity provider is available, and the synchronization module synchronizes the local single sign-on session with a master single sign-on session that is available to the plurality of local identity providers and marks the local single sign-on session as synchronized with the master identity provider.

15. The system of claim 14, further comprising:
a local identity provider including the authentication module, the processing module, and the synchronization module.

16. The system of claim 14, wherein the local identity provider sends the identity for the user and local single sign-on session information including the identifier of the local single sign-on session to the master identity provider.

17. The system of claim 14, wherein the master identity provider receives the identity for the user and the local single sign-on session information and determines whether the master single sign-on session exists.

18. The system of claim 17, wherein in response to a determination that the master single sign-on session exists, the master identity provider associates the local single sign-on session with the master single sign-on session.

19. The system of claim 14, wherein the local identity provider receives a logout request from the web application and determines that the master identity provider associated with the plurality of local identity providers is unavailable, wherein after determining that the master identity provider is unavailable, the local identity provider determines that the master identity provider is available, forwards the logout request to the master identity provider, and receives the logout request from the master identity provider, wherein in response to receiving the logout request from the master identity provider, the local identity provider destroys the local single sign-on session in response to an instruction from the master identity provider.

20. A non-transitory machine-readable medium comprising a plurality of machine-readable instructions that when executed by one or more processors is adapted to cause the one or more processors to perform a method comprising:

receiving an authentication request from a web application of a user device, the web application running in a browser;
establishing a local single sign-on session between the local identity provider and the browser;
determining that a master identity provider associated with the plurality of local identity providers is unavailable;
in response to determining that the master identity provider is unavailable, marking the local single sign-on session as unsynchronized with the master identity provider; and
after marking the local single sign-on session as unsynchronized with the master identity provider:
    determining that the master identity provider is available;
    after determining that the master identity provider is available, synchronizing the local single sign-on session with a master single sign-on session that is available to the plurality of local identity providers; and
marking the local single sign-on session as synchronized with the master identity provider.

\* \* \* \* \*